United States Patent
Liu et al.

(10) Patent No.: US 10,455,380 B2
(45) Date of Patent: Oct. 22, 2019

(54) REDIRECTION METHOD AND APPARATUS

(71) Applicant: HUAWEI TECHNOLOGIES CO., LTD., Shenzhen, Guangdong (CN)

(72) Inventors: Jing Liu, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/010,665

(22) Filed: Jun. 18, 2018

(65) Prior Publication Data

US 2018/0302760 A1 Oct. 18, 2018

Related U.S. Application Data

(63) Continuation of application No. PCT/CN2015/097952, filed on Dec. 18, 2015.

(51) Int. Cl.
*H04W 4/16* (2009.01)
*H04W 36/26* (2009.01)
(Continued)

(52) U.S. Cl.
CPC .............. *H04W 4/16* (2013.01); *H04W 8/02* (2013.01); *H04W 36/26* (2013.01); *H04W 76/27* (2018.02);
(Continued)

(58) Field of Classification Search
CPC ....... H04W 4/16; H04W 76/27; H04W 76/30; H04W 8/02; H04W 36/26; H04W 36/0055
See application file for complete search history.

(56) References Cited

U.S. PATENT DOCUMENTS

2013/0029668 A1 1/2013 Uchiyama et al.
2013/0171991 A1 7/2013 Fujino et al.
(Continued)

FOREIGN PATENT DOCUMENTS

CN 101400102 A 4/2009
CN 101742576 A 6/2010
(Continued)

OTHER PUBLICATIONS

3GPP TS 23.401 V13.5.0 (Dec. 2015);3rd Generation Partnership Project;Technical Specification Group Services and System Aspects;General Packet Radio Service (GPRS) enhancements for Evolved Universal Terrestrial Radio Access Network (E-UTRAN) access(Release 13),total 337 pages.
(Continued)

*Primary Examiner* — Nam T Huynh
(74) *Attorney, Agent, or Firm* — Fish & Richardson P.C.

(57) ABSTRACT

This application relates to the field of communications technologies, and discloses example redirection methods and apparatuses to ensure that a call drop does not occur after UE is redirected. One example method includes determining, by a base station, that a redirection operation needs to be performed on user equipment UE, and then instructing a core network to reserve a guaranteed bit rate (GBR) bearer or a voice service bearer that is corresponding to the UE. The UE is then instructed to reserve the GBR bearer or the voice service bearer that is corresponding to the UE. After the UE is redirected to a new base station, the voice service bearer of the UE is reserved on a UE side.

14 Claims, 8 Drawing Sheets

(51) Int. Cl.
 H04W 76/30 (2018.01)
 H04W 76/27 (2018.01)
 H04W 8/02 (2009.01)
 H04W 36/00 (2009.01)

(52) U.S. Cl.
 CPC ........ H04W 76/30 (2018.02); *H04W 36/0055* (2013.01)

(56) References Cited

U.S. PATENT DOCUMENTS

| | | | |
|---|---|---|---|
| 2015/0003342 A1 | 1/2015 | Swaminathan et al. | |
| 2015/0365852 A1 | 12/2015 | Xu et al. | |
| 2016/0112916 A1 | 4/2016 | Kim et al. | |
| 2018/0124674 A1* | 5/2018 | Vutukuri | H04W 36/30 |

FOREIGN PATENT DOCUMENTS

| | | | | |
|---|---|---|---|---|
| CN | 103222332 A | 7/2013 | | |
| CN | 103687055 A | 3/2014 | | |
| CN | 102405683 B | 4/2014 | | |
| CN | 104066133 A | 9/2014 | | |
| CN | 104429151 A | 3/2015 | | |
| CN | 104994542 A | 10/2015 | | |
| EP | 2836017 A1 | 2/2015 | | |
| WO | 2011109998 A1 | 9/2011 | | |
| WO | WO-2016150046 A1 * | 9/2016 | ............ | H04W 88/06 |

OTHER PUBLICATIONS

3GPP TS 29.274 V13.4.0 (Dec. 2015);3rd Generation Partnership Project;Technical Specification Group Core Network and Terminals;3GPP Evolved Packet System (EPS); Evolved General Packet Radio Service (GPRS) Tunnelling Protocol for Control plane (GTPv2-C); Stage 3(Release 13),total 341 pages.
3GPP TS 36.133 V13.1.0 (Sep. 2015);3rd Generation Partnership Project;Technical Specification Group Radio Access Network;Evolved Universal Terrestrial Radio Access (E-UTRA);Requirements for support of radio resource management(Release 13),total 1430 pages.
International Search Report issued in International Application No. PCT/CN2015/097952 dated Jun. 22, 2016, 12 pages.
International Search Report issued in International Application No. PCT/CN2015/097954 dated Aug. 15, 2016, 12 pages.
Extended European Search Report issued in European Application No. 15910586.5 dated Oct. 16, 2018, 11 pages.

* cited by examiner

REDIRECTION METHOD AND APPARATUS

CROSS-REFERENCE TO RELATED APPLICATIONS

This application is a continuation of International Application No. PCT/CN2015/097952, filed on Dec. 18, 2015, the disclosure of which is hereby incorporated by reference in its entirety.

TECHNICAL FIELD

This application relates to the field of communications technologies, and in particular, to a redirection method and apparatus.

BACKGROUND

In a Long Term Evolution (LTE) network, when user equipment (UE) performs a voice service (such as Voice over LTE, VoLTE for short), because quality of a link between the UE and a base station becomes worse, the base station may trigger a redirection operation for the UE.

After the redirection operation, the voice service of the UE encounters a call drop.

SUMMARY

This application provides a redirection method and apparatus, to resolve a prior-art problem that a voice service encounters a call drop after UE is redirected.

According to a first aspect, a redirection method is provided, and the method includes:

determining, by a base station, that a redirection operation needs to be performed on user equipment UE, and then instructing a core network to reserve a guaranteed bit rate GBR bearer or a voice service bearer that is corresponding to the UE; and instructing the UE to reserve the GBR bearer or the voice service bearer that is corresponding to the UE, where the GBR bearer includes the voice service bearer.

With reference to the first aspect, in a first possible implementation of the first aspect, the instructing, by a base station, a core network to reserve a GBR bearer or a voice service bearer that is corresponding to the UE includes:

sending, by the base station, a UE context release request message to a mobility management network element, where the UE context release request message carries first voice redirection cause indication information, and the first voice redirection cause indication information is used to instruct to reserve the GBR bearer or the voice service bearer that is corresponding to the UE.

With reference to the first possible implementation of the first aspect, in a second possible implementation of the first aspect, the instructing, by the base station, the UE to reserve the GBR bearer or the voice service bearer that is corresponding to the UE includes:

sending, by the base station, a radio resource control RRC connection release message to the UE, where the RRC connection release message carries second voice redirection cause indication information, and the second voice redirection cause indication information is used to instruct to reserve the GBR bearer or the voice service bearer that is corresponding to the UE.

With reference to any one of the first aspect, or the first or the second possible implementation of the first aspect, in a third possible implementation of the first aspect, the determining, by a base station, that a redirection operation needs to be performed on UE includes:

when quality of a link between the base station and the UE cannot meet a current voice service quality requirement of the UE, determining, by the base station, that the redirection operation needs to be performed on the UE.

According to a second aspect, a redirection method is provided, and includes:

receiving, by a mobility management network element, a notification message sent by a base station, where the notification message includes an instruction for reserving a GBR bearer or a voice service bearer that is corresponding to user equipment UE;

reserving, by the mobility management network element according to the notification message, the GBR bearer or the voice service bearer that is corresponding to the UE; and instructing a gateway device to reserve the GBR bearer or the voice service bearer that is corresponding to the UE.

With reference to the second aspect, in a first possible implementation of the second aspect, the receiving, by a mobility management network element, a notification message sent by a base station includes:

receiving, by the mobility management network element, a UE context release request message sent by the base station, where the UE context release request message carries voice redirection cause indication information, and the voice redirection cause indication information is used to instruct to reserve the GBR bearer or the voice service bearer that is corresponding to the UE.

With reference to the second aspect or the first possible implementation of the second aspect, in a second possible implementation of the second aspect, the instructing, by the mobility management network element, a gateway device to reserve the GBR bearer or the voice service bearer that is corresponding to the UE includes:

sending, by the mobility management network element, a suspend bearer message to the gateway device, where the suspend bearer message is used to instruct the gateway device to reserve the GBR bearer or the voice service bearer that is corresponding to the UE.

With reference to any one of the second aspect, or the first or the second possible implementation of the second aspect, in a third possible implementation of the second aspect, the reserving, by the mobility management network element according to the notification message, the GBR bearer or the voice service bearer that is corresponding to the UE includes:

starting, by the mobility management network element, a timer, and before the timer expires, reserving the GBR bearer or the voice service bearer that is corresponding to the UE.

With reference to the second or the third possible implementation of the second aspect, in a fourth possible implementation of the second aspect, after the mobility management network element returns a response message for the notification message to the base station, the method further includes:

receiving, by the mobility management network element, a UE initial information request message sent by another base station; and based on the request message, feeding, by the mobility management network element, an initial UE context setup acknowledge message back to the another base station, and sending, to the gateway device, an unsuspend bearer message corresponding to the suspend bearer message, where the unsuspend bearer message is used to instruct the gateway device to resume use of the reserved GBR bearer or the reserved voice service bearer that is corresponding to the UE, the initial UE context setup acknowledge message includes information about the GBR bearer or the voice service bearer that is corresponding to the UE and that is reserved by the mobility management network element, and the information is used by the another base station to trigger setup of the GBR bearer or the voice service bearer that is corresponding to the UE.

According to a third aspect, a redirection method is provided, and includes:

receiving, by user equipment UE, a redirection message sent by a first base station, where the redirection message carries voice redirection cause indication information, and the voice redirection cause indication information is used to instruct to reserve a GBR bearer or a voice service bearer that is corresponding to the UE; and reserving, by the UE, the GBR bearer or the voice service bearer that is corresponding to the UE.

With reference to the third aspect, in a first possible implementation of the third aspect, the method further includes:

accessing, by the UE, a second base station according to carrier information included in the redirection message.

With reference to the first possible implementation of the third aspect, in a second possible implementation of the third aspect, the method further includes:

receiving, by the UE, configuration information that is sent by the second base station and that is for setting up the GBR bearer or the voice service bearer that is corresponding to the UE; and setting up, with the second base station according to the configuration information, the GBR bearer or the voice service bearer that is corresponding to the UE.

According to a fourth aspect, a redirection apparatus is provided, and includes:

a determining unit, configured to determine that a redirection operation needs to be performed on user equipment UE;

a notification unit, configured to: after the determining unit determines that the redirection operation needs to be performed on the user equipment UE, instruct a core network to reserve a guaranteed bit rate GBR bearer or a voice service bearer that is corresponding to the UE; and an instruction unit, configured to: after the determining unit determines that the redirection operation needs to be performed on the user equipment UE, instruct the UE to reserve the GBR bearer or the voice service bearer that is corresponding to the UE, where the GBR bearer includes the voice service bearer.

With reference to the fourth aspect, in a first possible implementation of the fourth aspect, the notification unit is specifically configured to:

send a UE context release request message to a mobility management network element, where the UE context release request message carries first voice redirection cause indication information, and the first voice redirection cause indication information is used to instruct to reserve the GBR bearer or the voice service bearer that is corresponding to the UE.

With reference to the first possible implementation of the fourth aspect, in a second possible implementation of the fourth aspect, the instruction unit is specifically configured to:

send a radio resource control RRC connection release message to the UE, where the RRC connection release message carries second voice redirection cause indication information, and the second voice redirection cause indication information is used to instruct to reserve the GBR bearer or the voice service bearer that is corresponding to the UE.

With reference to the fourth aspect, or the first or the second possible implementation of the fourth aspect, in a third possible implementation of the fourth aspect, the determining unit is specifically configured to:

when quality of a link between the apparatus and the UE cannot meet a current voice service quality requirement of the UE, determine that the redirection operation needs to be performed on the UE.

According to a fifth aspect, a redirection apparatus is provided, and includes:

a receiving unit, configured to receive a notification message sent by a base station, where the notification message includes an instruction for reserving a GBR bearer or a voice service bearer that is corresponding to user equipment UE;

a reservation unit, configured to reserve, according to the notification message received by the receiving unit, the GBR bearer or the voice service bearer that is corresponding to the UE; and a notification unit, configured to instruct a gateway device to reserve the GBR bearer or the voice service bearer that is corresponding to the UE.

With reference to the fifth aspect, in a first possible implementation of the fifth aspect, the receiving unit is specifically configured to:

receive a UE context release request message sent by the base station, where the UE context release request message carries voice redirection cause indication information, and the voice redirection cause indication information is used to instruct to reserve the GBR bearer or the voice service bearer that is corresponding to the UE.

With reference to the fifth aspect or the first possible implementation of the fifth aspect, in a second possible implementation of the fifth aspect, the notification unit is specifically configured to:

send a suspend bearer message to the gateway device, where the suspend bearer message is used to instruct the gateway device to reserve the GBR bearer or the voice service bearer that is corresponding to the UE.

With reference to any one of the fifth aspect, or the first or the second possible implementation of the fifth aspect, in a third possible implementation of the fifth aspect, the reservation unit is specifically configured to:

start a timer, and before the timer expires, reserve the GBR bearer or the voice service bearer that is corresponding to the UE.

With reference to the second or the third possible implementation of the fifth aspect, in a fourth possible implementation of the fifth aspect, the receiving unit is further configured to:

receive a UE initial information request message sent by another base station; and the notification unit is further configured to: after the receiving unit receives the UE initial information request message sent by the another base station, based on the request message, feed an initial UE context setup acknowledge message back to the another base station, and send, to the gateway device, an unsuspend bearer message corresponding to the suspend bearer message, where the unsuspend bearer message is used to instruct the gateway device to resume use of the reserved GBR bearer or the reserved voice service bearer that is corresponding to the UE, the initial UE context setup acknowledge message includes information about the GBR bearer or the voice service bearer that is corresponding to the UE and that is reserved by the apparatus, and the information is used by the another base station to trigger setup of the GBR bearer or the voice service bearer that is corresponding to the UE.

According to a sixth aspect, a redirection apparatus is provided, and includes:

a receiving unit, configured to receive a redirection message sent by a first base station, where the redirection message carries voice redirection cause indication information, and the voice redirection cause indication information is used to instruct to reserve a GBR bearer or a voice service bearer that is corresponding to the apparatus; and a reservation unit, configured to reserve the GBR bearer or the voice service bearer that is corresponding to the apparatus.

With reference to the sixth aspect, in a first possible implementation of the sixth aspect, the apparatus further includes:

an access unit, configured to access a second base station according to carrier information included in the redirection message.

With reference to the first possible implementation of the sixth aspect, in a second possible implementation of the sixth aspect, the apparatus further includes:

a bearer setup unit, configured to: set up, with the second base station according to the configuration information, the GBR bearer or the voice service bearer that is corresponding to the apparatus.

According to a seventh aspect, a redirection apparatus is provided, and includes a transceiver, a processor, a memory, and a bus, where the transceiver, the processor, and the memory are all connected to the bus, the memory stores a group of programs, and the processor is configured to invoke the programs stored in the memory, to enable the apparatus to perform the method according to any one of the first aspect, or the first to the third possible implementations of the first aspect.

According to an eighth aspect, a mobility management network element is provided, and includes a transceiver, a processor, a memory, and a bus, where the transceiver, the processor, and the memory are all connected to the bus, the memory stores a group of programs, and the processor is configured to invoke the programs stored in the memory, to enable the mobility management network element to perform the method according to any one of the second aspect, or the first to the fourth possible implementations of the second aspect.

According to a ninth aspect, user equipment is provided, and includes a transceiver, a processor, a memory, and a bus, where the transceiver, the processor, and the memory are all connected to the bus, the memory stores a group of programs, and the processor is configured to invoke the programs stored in the memory, to enable the user equipment to perform the method according to any one of the third aspect, or the first or the second possible implementation of the third aspect.

In this application, after determining to trigger the redirection operation for the UE, the base station instructs the core network to reserve the GBR bearer or the voice service bearer that is corresponding to the UE, and instructs the UE to reserve the GBR bearer or the voice service bearer that is corresponding to the UE. The GBR bearer includes the voice service bearer. This ensures that after the UE is redirected to a new base station, the voice service bearer of the UE is reserved on a UE side. In addition, because the core network reserves the voice service bearer of the UE, after receiving a request message from the new base station, the core network may trigger the new base station to set up a voice service bearer between the new base station and the UE. Once the voice service bearer is successfully set up, the UE can perform a voice service on the voice service bearer, so as to ensure that the voice service is successfully performed, and a call drop does not occur after the UE is redirected.

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

Figure 1:
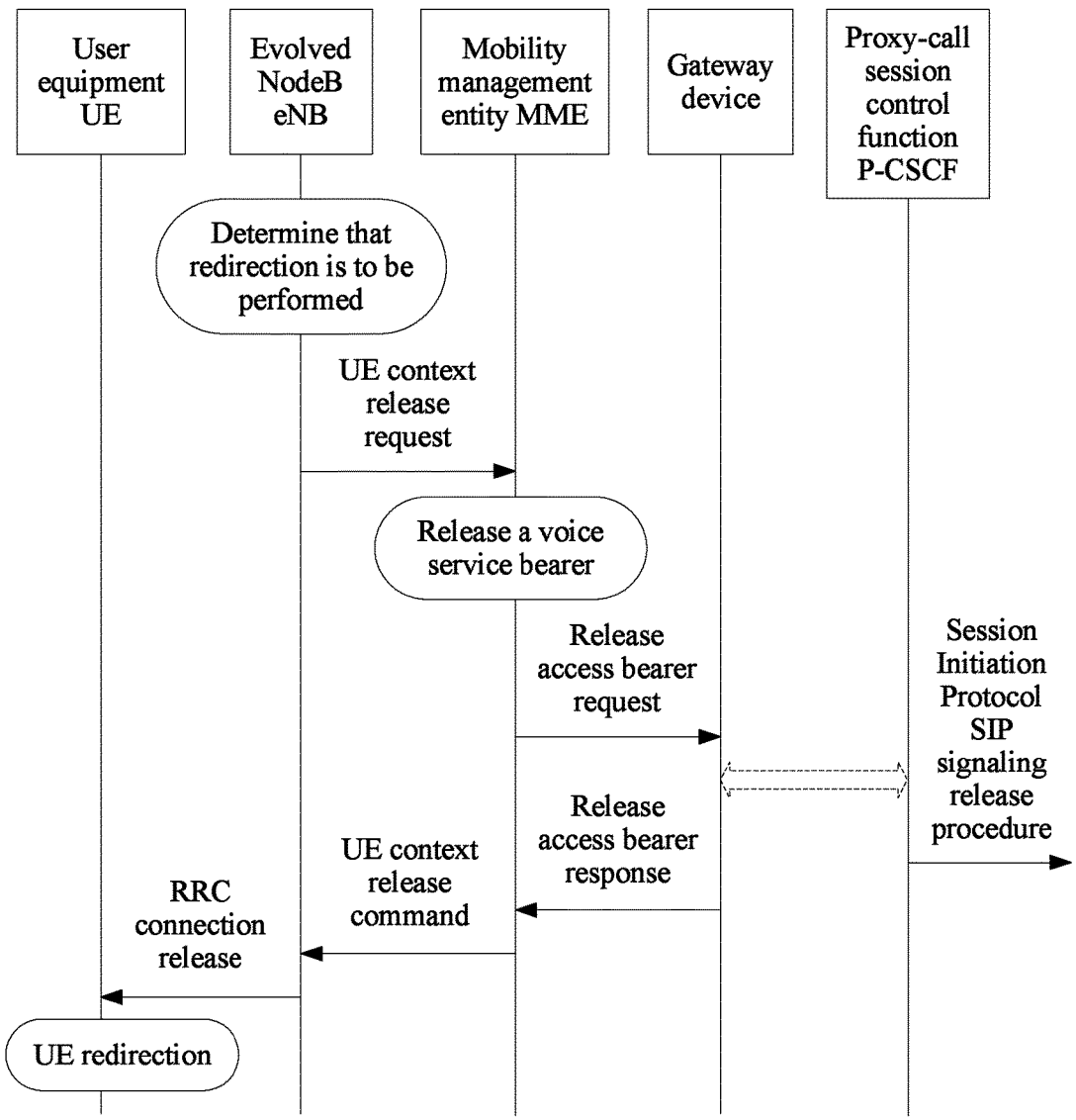
FIG. 1 is a schematic flowchart of a redirection method in the prior art.

Referring to FIG. 1, in an LTE network, after a base station determines that a redirection operation is to be performed on UE, the base station sends a UE context release request message to a mobility management entity (MME). After the MME receives the UE context release request message sent by the base station, the MME is to release a minimum guaranteed bit rate (GBR) bearer of the UE. The GBR bearer includes a voice service bearer whose QCI=1. This means that the MME is to release the voice service bearer of the UE.

Further, the MME sends a release access bearer request message to a gateway device, to instruct the gateway device to release the GBR bearer of the UE. This also means that the voice service bearer of the UE is to be released. The gateway device includes a serving gateway (SGW) or a PDN gateway (PGW). Then, the gateway device returns a release access bearer response message to the MME, and triggers a Session Initiation Protocol (SIP) signaling release procedure by using a proxy-call session control function (P-CSCF), to enable peer UE of the UE to release a current voice session.

Still further, after receiving the release access bearer response message returned by the SGW/PGW, the MME returns a UE context release command message to the base station. The base station sends a radio resource control (RRC) connection release message, to the UE. The message carries carrier information for redirection.

After receiving the RRC connection release message, the UE does not release the voice service bearer. In this case, after accessing a new base station according to the carrier information that is for redirection and that is indicated by the base station, the UE does not trigger setup of a voice service bearer. In addition, because the MME and the gateway device have released the voice service bearer of the UE, a voice service encounters a call drop after the UE is redirected.

In view of the problem that a voice service encounters a call drop after the UE is redirected, in this application, after determining that the redirection operation is to be performed on the UE, the base station instructs a core network to reserve the GBR bearer or the voice service bearer that is corresponding to the UE, and instructs the UE to reserve the GBR bearer or the voice service bearer that is corresponding to the UE. The GBR bearer includes the voice service bearer. In this way, after the UE is redirected, because the GBR bearer or the voice service bearer that is corresponding to the UE is reserved on a core network side, the base station may be triggered to set up a GBR bearer or a voice service bearer between the base station and the UE. After the GBR bearer or the voice service bearer is successfully set up, the UE may transmit a voice service on the voice service bearer that is successfully set up, so as to ensure that a call drop does not occur after the UE is redirected.

Figure 2:
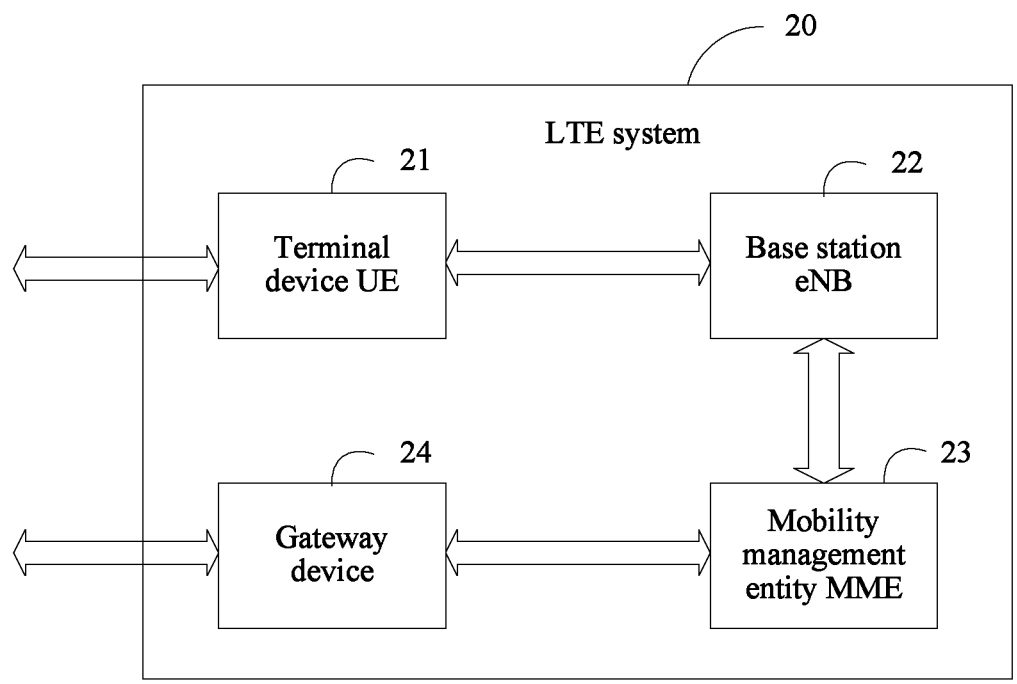
FIG. 2 is a schematic diagram of a network architecture applied to this application.

This application is applied to an LTE network, and in particular, relates to a voice service in the LTE network. A network architecture applied to this application is shown in FIG. 2. An LTE system 20 includes UE 21, a base station 22, an MME 23, and a gateway device 24. The UE 21 may be calling UE that performs a voice service, or may be called UE that performs a voice service. The base station 22 is an evolved NodeB (eNB), and the eNB is conceptually equivalent to a base station in the following description of the embodiments. The MME 23 is a mobility management network element. The mobility management network element may alternatively be a serving GPRS support node (SGSN). In this application, for example, the mobility management network element is an MME, and the MME is conceptually equivalent to a mobility management network element in the following description of the embodiments. The gateway device 24 includes an SGW or a PGW. The MME 23 and the gateway device 24 may serve one or more eNBs. After the UE 21 is redirected to a new eNB, the UE 21 may be served by an original MME and an original gateway device, or may be served by a new MME and a new gateway device.

With reference to specific embodiments, the following describes in detail a redirection method and apparatus provided in this application.

Figure 3:
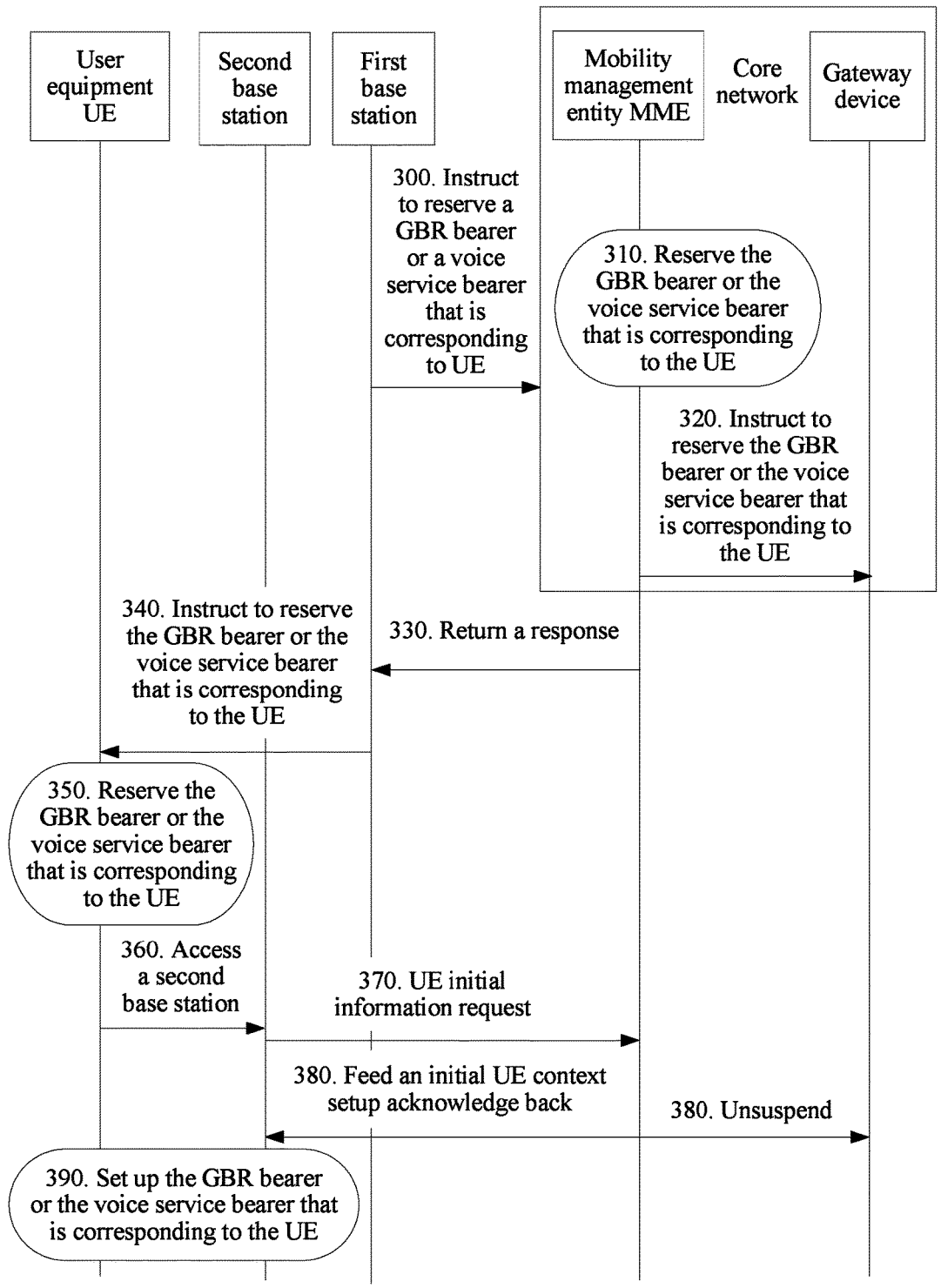
FIG. 3 is a schematic flowchart of a redirection method in this application.

Referring to FIG. 3, a procedure of a redirection method provided in this application is descried as follows: In the following, for ease of description, a base station accessed by UE before the UE is redirected is referred to as a first base station, and a base station accessed by the UE after the UE is redirected is referred to as a second base station.

Step 300: A first base station determines that a redirection operation needs to be performed on UE, and then instructs a core network to reserve a GBR bearer or a voice service bearer that is corresponding to the UE.

There are multiple reasons why the first base station determines that the redirection operation needs to be performed on the UE. For example, the first base station finds, according to a measurement report of the UE, that quality of a link between the first base station and the UE cannot meet a current voice service quality requirement of the UE, and therefore, the first base station determines that the redirection operation needs to be performed on the UE.

Once the first base station determines to trigger the redirection operation for the UE, the first base station sends a UE context release request message to the core network. The UE context release request message carries first voice redirection cause indication information, and the first voice redirection cause indication information is used to instruct to reserve the GBR bearer or the voice service bearer that is corresponding to the UE.

Specifically, the first base station sends the UE context release request message, to an MME in the core network. The UE context release request message carries a release cause field. In this application, voice redirection cause indication information, that is, the first voice redirection cause indication information, is added to the release cause field. The first voice redirection cause indication information is used to instruct the MME in the core network to reserve the GBR bearer or the voice service bearer that is corresponding to the UE.

Step 310: An MME receives a notification message sent by the first base station, where the notification message includes an instruction for reserving the GBR bearer or the voice service bearer that is corresponding to the user equipment UE; and the MME reserves, according to the notification message, the GBR bearer or the voice service bearer that is corresponding to the UE.

Specifically, the MME receives the UE context release request message, sent by the first base station. The UE context release request message carries the first voice redirection cause indication information. After analyzing the message, the MME determines that the message carries the first voice redirection cause indication information. In this case, the MME locally reserves, according to the message, the GBR bearer or the voice service bearer that is corresponding to the UE.

Optionally, the MME starts a timer, and before the timer expires, the MME locally reserves the GBR bearer or the voice service bearer that is corresponding to the UE.

Step 320: The MME instructs a gateway device to reserve the GBR bearer or the voice service bearer that is corresponding to the UE.

In addition to locally reserving the GBR bearer or the voice service bearer that is corresponding to the UE, the MME needs to instruct the gateway device to reserve the GBR bearer or the voice service bearer that is corresponding to the UE.

Specifically, the MME sends a suspend bearer message to the gateway device, and receives an acknowledge message that is fed back by the gateway device for the suspend bearer message. The suspend bearer message is a suspend notification, and the suspend bearer message is used to instruct the gateway device to reserve the GBR bearer or the voice service bearer that is corresponding to the UE.

That is, the MME sends the suspend notification to an SGW or a PGW, to instruct the SGW or the PGW to suspend the GBR bearer or the voice service bearer that is corresponding to the UE. After receiving a suspend acknowledge returned by the SGW or the PGW, the MME may determine that the SGW or the PGW has suspended the GBR bearer or the voice service bearer that is corresponding to the UE.

In this process, because the gateway device suspends the GBR bearer or the voice service bearer that is corresponding to the UE, peer UE that communicates with the UE is not triggered to perform a voice session release process.

Step 330: The MME returns a response message for the notification message to the first base station.

Specifically, for the UE context release request message, sent by the first base station, the MME returns a UE context release command, to the first base station.

Step 340: The first base station instructs the UE to reserve the GBR bearer or the voice service bearer that is corresponding to the UE.

The first base station sends a redirection message to the UE, and the redirection message carries instruction information for instructing the UE to reserve the GBR bearer or the voice service bearer that is corresponding to the UE.

Specifically, after receiving the UE context release command returned by the MME in the core network, the first base station sends an RRC connection release message, to the UE. The RRC connection release message carries second voice redirection cause indication information, and the second voice redirection cause indication information is used to instruct the UE to reserve the GBR bearer or the voice service bearer that is corresponding to the UE. The RRC connection release message further carries carrier information for UE redirection, and the carrier information is used to indicate a location of a new base station to which the UE is to be redirected. The first base station learns that another surrounding base station is more suitable for access of the UE to meet voice service quality of the UE. Therefore, the first base station adds, to the RRC connection release message, carrier information of the another base station that is more suitable for access of the UE.

The RRC connection release message sent by the first base station to the UE carries a release cause field. In this application, voice redirection cause indication information, that is, the second voice redirection cause indication information, is added to the release cause field. The second voice redirection cause indication information is used to instruct to reserve the GBR bearer or the voice service bearer that is corresponding to the UE.

Step 350: The UE receives a redirection message sent by the first base station, where the redirection message carries second voice redirection cause indication information; and the UE reserves the GBR bearer or the voice service bearer that is corresponding to the UE.

Specifically, the UE receives the RRC connection release message sent by the first base station, and parses the release cause field in the RRC connection release message to determine that the second voice redirection cause indication information exists. In this case, the UE reserves the GBR bearer or the voice service bearer that is corresponding to the UE.

The UE may further learn of the carrier information for redirection according to the RRC connection release message.

In this case, according to the foregoing processing process, it can be ensured that the voice service bearer corresponding to the UE is not released on a UE side or a core network side, and the peer UE does not release a current voice session.

Step 360: The UE accesses a second base station according to carrier information included in the redirection message.

Specifically, the UE is redirected to the second base station according to the carrier information included in the RRC connection release message sent by the first base station. That is, the UE establishes an RRC connection to the second base station.

It should be noted that the second base station and the first base station may be connected to a same MME, or the second base station and the first base station may be connected to different MMEs. The following first assumes that the second base station and the first base station are connected to a same MME.

Step 370: The MME receives a UE initial information request message, that is, a UE initial message request message, sent by another base station.

The another base station is the second base station, that is, the base station accessed by the UE after the UE is redirected.

Step 380: Based on the request message, the MME feeds an initial UE context setup acknowledge message back to the another base station, and sends, to the gateway device, an unsuspend bearer message corresponding to a suspend bearer message.

The unsuspend bearer message is used to instruct the gateway device to resume use of the reserved GBR bearer or the reserved voice service bearer that is corresponding to the UE. The initial UE context setup acknowledge message includes information about the GBR bearer or the voice service bearer that is corresponding to the UE and that is reserved by the MME, and the information is used by the second base station to trigger setup of the GBR bearer or the voice service bearer that is corresponding to the UE.

Specifically, after receiving the UE initial message request message sent by the second base station, the MME feeds an initial UE context setup request message back to the second base station. Because the MME previously reserves the GBR bearer or the voice service bearer that is corresponding to the UE, the MME adds, to the initial UE context setup request message fed back to the second base station, the information about the previously reserved GBR bearer or the previously reserved voice service bearer that is corresponding to the UE.

The MME further sends a resume notification message to the SGW or the PGW, to instruct the SGW or the PGW to unsuspend, that is, resume use of, the previously suspended GBR bearer or the previously suspended voice service bearer that is corresponding to the UE.

It should be noted that there are specific definitions for the messages in 29.274. The suspend bearer message is the suspend notification and is sent by the MME to the SGW, and the unsuspend bearer message is the resume notification and is also sent by the MME to the SGW.

After the second base station receives the initial UE context setup request message sent by the MME, the second base station is triggered to set up a voice service bearer with the UE. The second base station sends, to the UE, configuration information for setting up the voice service bearer corresponding to the UE.

In step 370 and step 380, if the second base station and the first base station are connected to different MMEs, after accessing the second base station, the UE triggers a tracking area update (TAU) process. In this process, a new MME may obtain a UE context from an original MME connected to the first base station. Therefore, the process of step 370 and step 380 is also applicable to such a case in which the second base station and the first base station are connected to different MMEs.

Step 390: The UE receives configuration information that is sent by the second base station and that is for setting up the voice service bearer corresponding to the UE, and sets up, with the second base station according to the configuration information, the voice service bearer corresponding to the UE.

In this way, according to the method in this application, after the UE is redirected to the new base station, it can be ensured that the voice service bearer of the UE is reserved on the UE side. In addition, because the core network reserves the voice service bearer of the UE, after receiving a request message from the new base station accessed by the UE after the redirection, the core network may trigger the new base station to set up a voice service bearer between the new base station and the UE. Once the voice service bearer is successfully set up, the UE can perform a voice service on the voice service bearer, so as to ensure that the voice service is successfully performed, and a call drop does not occur after the UE is redirected.

The following further describes this application in detail with reference to an embodiment in a specific application scenario.

Figure 4:
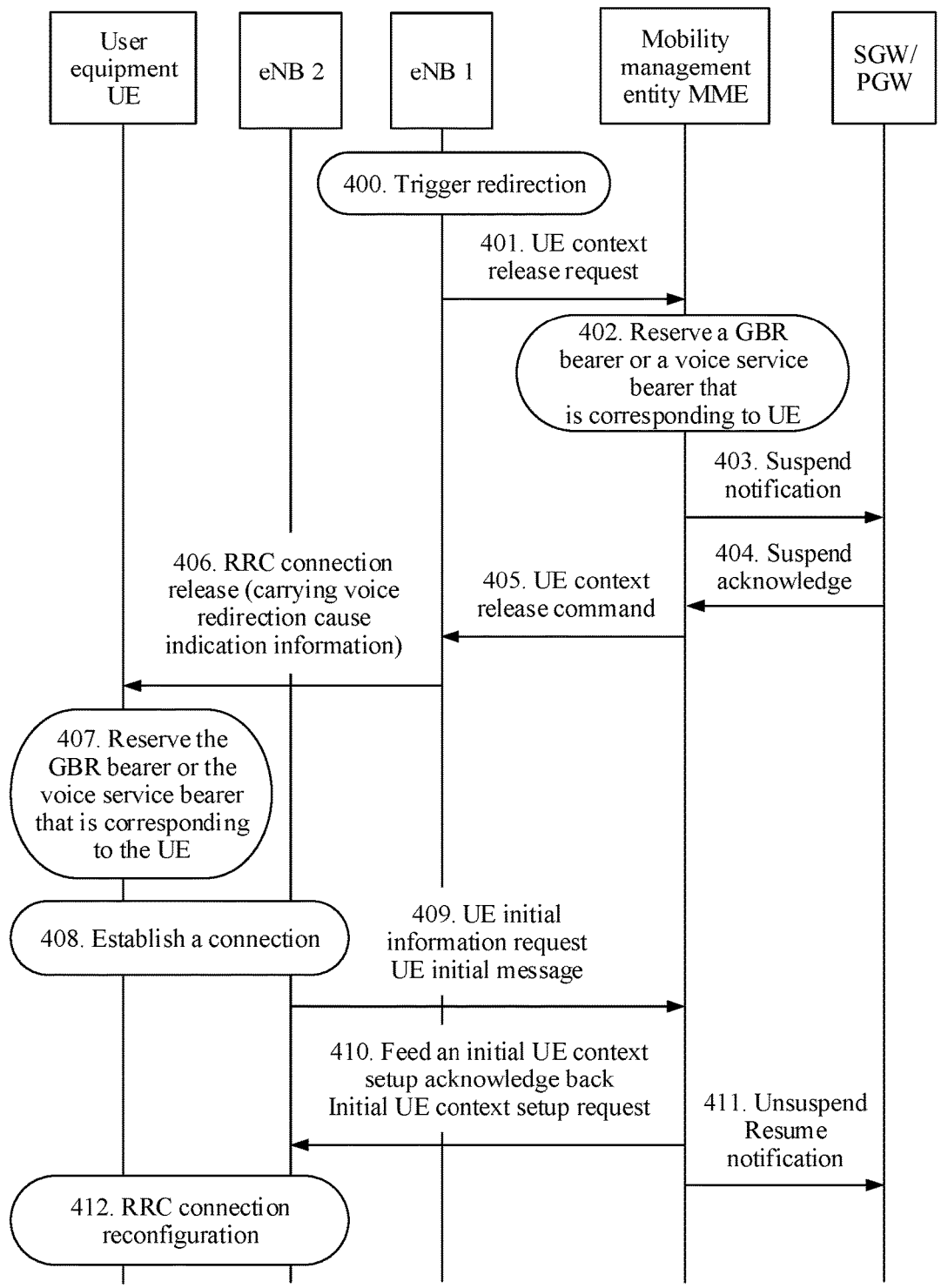
FIG. 4 is a flowchart of an example of a redirection process in an application scenario in this application.

Specifically, referring to FIG. 4, FIG. 4 is a specific flowchart of a redirection process in this embodiment. An SGW/PGW represents a gateway device. The SGW and the PGW are located in a same entity and may be logically separated. A base station accessed by the UE before the UE is redirected is an eNB 1, and a base station accessed by the UE after the UE is redirected is an eNB 2. In addition, the eNB 1 and the eNB 2 are connected to a same MME.

Step 400: An eNB1 triggers a redirection operation for UE.

Step 401: The eNB1 sends a UE context release request message to an MME.

The message carries instruction information, and the instruction information is used to instruct to reserve a GBR bearer or a voice service bearer of the UE. For example, the voice service bearer is corresponding to a bearer whose QCI=1. Specifically, the UE context release request message carries a release cause field. In this application, a voice redirection cause indication is added to the release cause field, to indicate that a cause for sending the UE context release request message this time is that the UE needs to be redirected to another base station.

Step 402: The MME reserves a GBR bearer or a voice service bearer that is corresponding to the UE.

Step 403: The MME sends a suspend notification message to an SGW/PGW, to instruct the SGW/PGW to suspend the GBR bearer or the voice service bearer that is corresponding to the UE.

Step 404: The SGW/PGW feeds a suspend acknowledge message back to the MME.

It should be noted that in this process, peer UE is not triggered to release a voice session.

Step 405: The MME returns a UE context release command to the eNB 1.

Step 406: The eNB 1 sends an RRC connection release message to the UE, where the message carries voice redirection cause indication information.

The voice redirection cause indication information is used to instruct the UE to reserve the GBR bearer or the voice service bearer that is corresponding to the UE.

The RRC connection release message further carries carrier information for UE redirection.

Step 407: After receiving the RRC connection release message, the UE reserves the voice service bearer corresponding to the UE.

Step 408: The UE is redirected to an eNB 2 according to carrier information that is carried in the RRC connection release message and that is for UE redirection, that is, the UE establishes a connection to the eNB 2.

Step 409: The eNB2 sends a UE initial message request message to the MME.

Step 410: The MME returns an initial UE context setup request message to the eNB 2.

Step 411: The MME sends a resume notification message to the SGW/PGW, to instruct the SGW/PGW to unsuspend the previously reserved GBR bearer or the previously reserved voice service bearer that is corresponding to the UE.

Step 410 and step 411 may be interchanged in a time sequence.

Step 412: The eNB2 performs RRC connection reconfiguration with the UE, to set up a voice service bearer between the eNB 2 and the UE.

Figure 5:
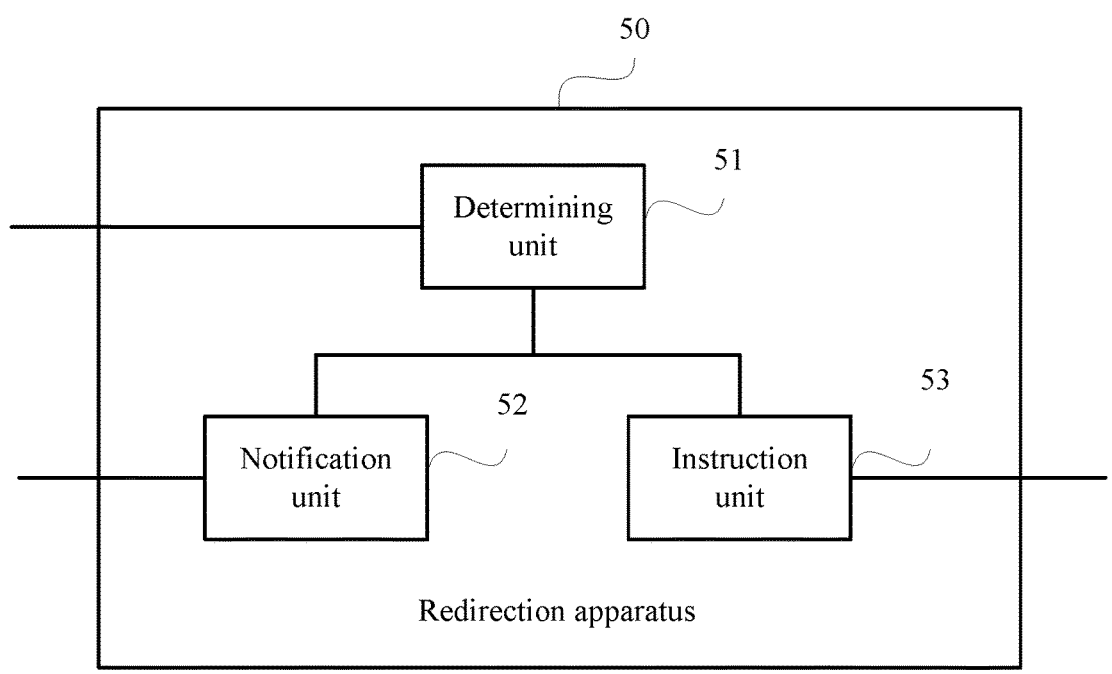
FIG. 5 is a schematic structural diagram of a first redirection apparatus in this application.

Based on a same inventive concept, referring to FIG. 5, this application provides a first redirection apparatus 50, configured to perform the method shown in FIG. 3. The apparatus 50 includes a determining unit 51, a notification unit 52, and an instruction unit 53.

The determining unit 51 is configured to determine that a redirection operation needs to be performed on user equipment UE.

The notification unit 52 is configured to: after the determining unit 51 determines that the redirection operation needs to be performed on the user equipment UE, instruct a core network to reserve a guaranteed bit rate GBR bearer or a voice service bearer that is corresponding to the UE.

The instruction unit 53 is configured to: after the determining unit 51 determines that the redirection operation needs to be performed on the user equipment UE, instruct the UE to reserve the GBR bearer or the voice service bearer that is corresponding to the UE.

The GBR bearer includes the voice service bearer.

Optionally, the notification unit 52 is specifically configured to:

send a UE context release request message to a mobility management network element, where the UE context release request message carries first voice redirection cause indication information, and the first voice redirection cause indication information is used to instruct to reserve the GBR bearer or the voice service bearer that is corresponding to the UE.

Optionally, the instruction unit 53 is specifically configured to:

send a radio resource control RRC connection release message to the UE, where the RRC connection release message carries second voice redirection cause indication information, and the second voice redirection cause indication information is used to instruct to reserve the GBR bearer or the voice service bearer that is corresponding to the UE.

Optionally, the determining unit 51 is specifically configured to:

when quality of a link between the apparatus and the UE cannot meet a current voice service quality requirement of the UE, determine that the redirection operation needs to be performed on the UE.

Figure 6:
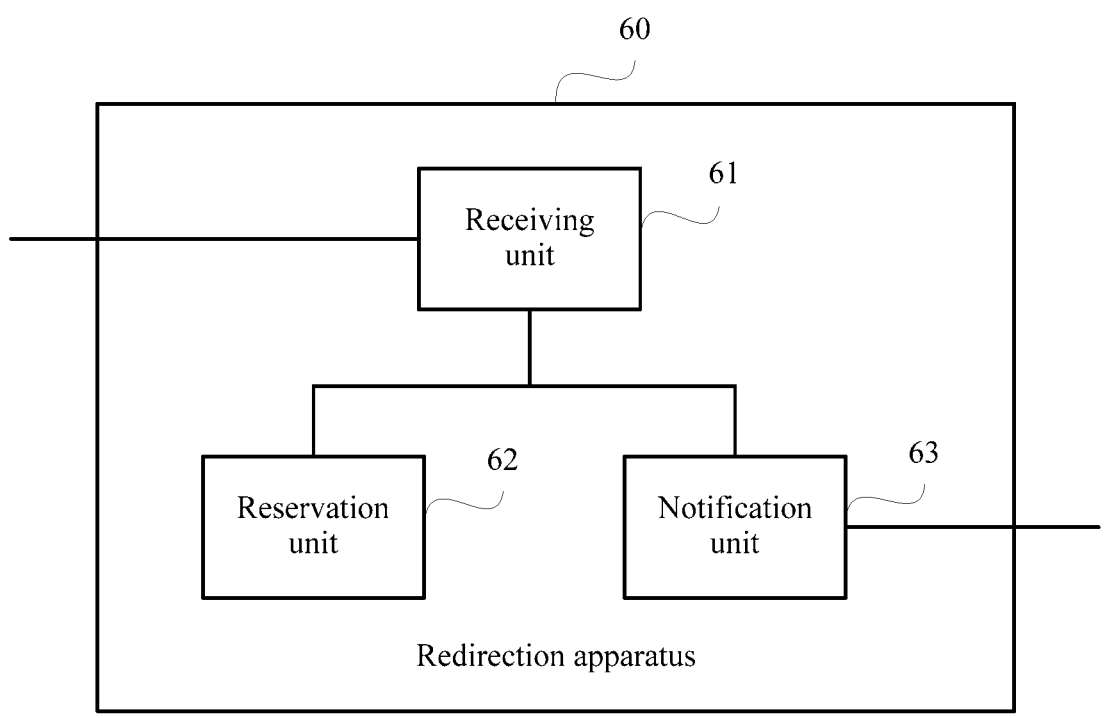
FIG. 6 is a schematic structural diagram of a second redirection apparatus in this application.

Based on a same inventive concept, referring to FIG. 6, this application provides a second redirection apparatus 60, configured to perform the method shown in FIG. 3. The apparatus 60 includes a receiving unit 61, a reservation unit 62, and a notification unit 63.

The receiving unit 61 is configured to receive a notification message sent by a base station, where the notification message includes an instruction for reserving a GBR bearer or a voice service bearer that is corresponding to user equipment UE.

The reservation unit 62 is configured to reserve, according to the notification message received by the receiving unit 61, the GBR bearer or the voice service bearer that is corresponding to the UE.

The notification unit 63 is configured to instruct a gateway device to reserve the GBR bearer or the voice service bearer that is corresponding to the UE.

Optionally, the receiving unit 61 is specifically configured to:

receive a UE context release request message sent by the base station, where the UE context release request message carries voice redirection cause indication information, and the voice redirection cause indication information is used to instruct to reserve the GBR bearer or the voice service bearer that is corresponding to the UE.

Optionally, the notification unit 63 is specifically configured to:

send a suspend bearer message to the gateway device, where the suspend bearer message is used to instruct the gateway device to reserve the GBR bearer or the voice service bearer that is corresponding to the UE.

Optionally, the reservation unit 62 is specifically configured to:

start a timer, and before the timer expires, reserve the GBR bearer or the voice service bearer that is corresponding to the UE.

Optionally, the receiving unit 61 is further configured to:

receive a UE initial information request message sent by another base station.

The notification unit 63 is further configured to: after the receiving unit 61 receives the UE initial information request message sent by the another base station, based on the request message, feed an initial UE context setup acknowledge message back to the another base station, and send, to the gateway device, an unsuspend bearer message corresponding to the suspend bearer message. The unsuspend bearer message is used to instruct the gateway device to resume use of the reserved GBR bearer or the reserved voice service bearer that is corresponding to the UE. The initial UE context setup acknowledge message includes information about the GBR bearer or the voice service bearer that is corresponding to the UE and that is reserved by the apparatus, and the information is used by the another base station to trigger setup of the GBR bearer or the voice service bearer that is corresponding to the UE.

Figure 7:
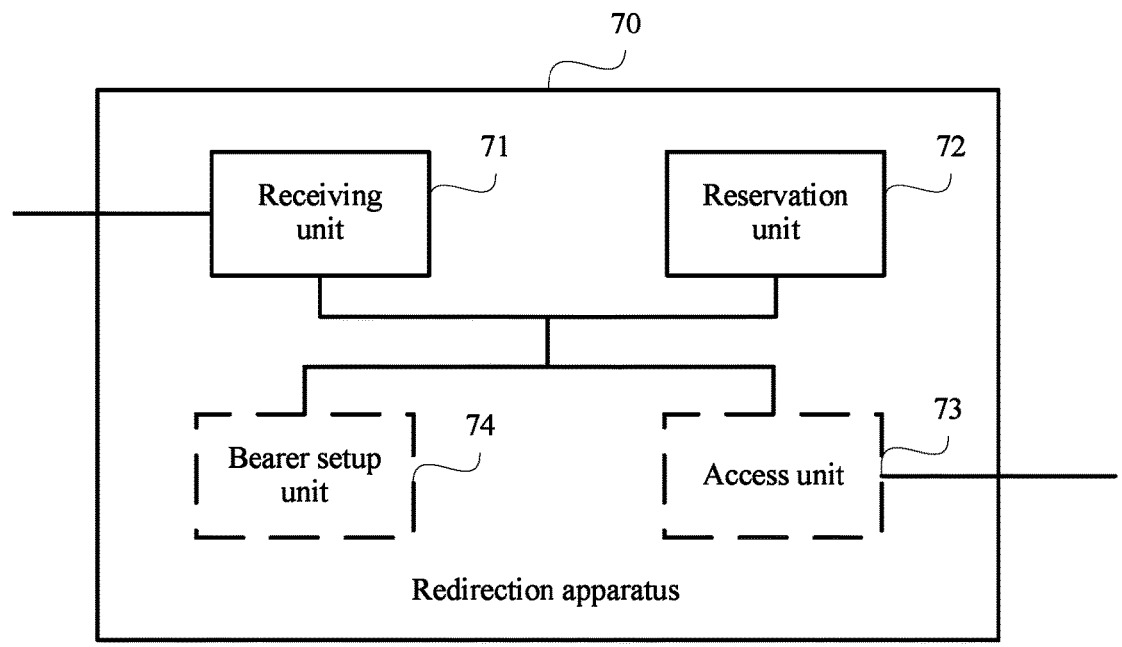
FIG. 7 is a schematic structural diagram of a third redirection apparatus in this application.

Based on a same inventive concept, referring to FIG. 7, this application provides a third redirection apparatus 70, configured to perform the method shown in FIG. 3. The apparatus 70 includes a receiving unit 71 and a reservation unit 72.

The receiving unit 71 is configured to receive a redirection message sent by a first base station, where the redirection message carries voice redirection cause indication information, and the voice redirection cause indication information is used to instruct to reserve a GBR bearer or a voice service bearer that is corresponding to the apparatus.

The reservation unit 72 is configured to reserve the GBR bearer or the voice service bearer that is corresponding to the apparatus.

Optionally, the apparatus 70 further includes an access unit 73.

The access unit 73 is configured to access a second base station according to carrier information included in the redirection message.

Optionally, the apparatus 70 further includes a bearer setup unit 74.

The bearer setup unit 74 is configured to: set up, with the second base station according to the configuration information, the GBR bearer or the voice service bearer that is corresponding to the apparatus.

Figure 8:
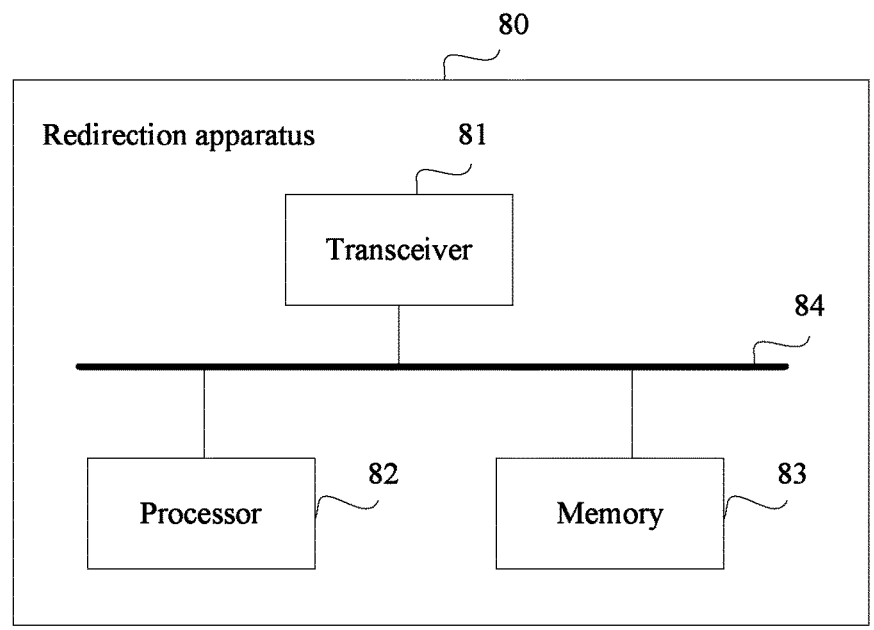
FIG. 8 is a schematic structural diagram of a fourth redirection apparatus in this application.

Based on a same inventive concept, referring to FIG. 8, this application provides a fourth redirection apparatus 80, including a transceiver 81, a processor 82, a memory 83, and a bus 84. The transceiver 81, the processor 82, and the memory 83 are all connected to the bus 84. The memory 83 stores a group of programs. The processor 82 is configured to invoke the programs stored in the memory 83, to enable the apparatus 80 to perform the redirection method provided in FIG. 3.

In FIG. 8, a bus architecture may include any quantity of interconnected buses and bridges, and specifically links various circuits of one or more processors represented by the processor 82 and a memory represented by the memory 83. The bus architecture may further link various other circuits such as a peripheral device, a voltage stabilizer, and a power management circuit. These circuits are all well known in the art, and therefore, are not further described in this specification. The bus provides an interface. The transceiver 81 may be multiple components, that is, the transceiver includes a transmitter and a receiver, and provides a unit configured to communicate with various other apparatuses on a transmission medium. The processor 82 is responsible for bus architecture management and general processing. The memory 83 may store data used when the processor 82 performs an operation.

Figure 9:
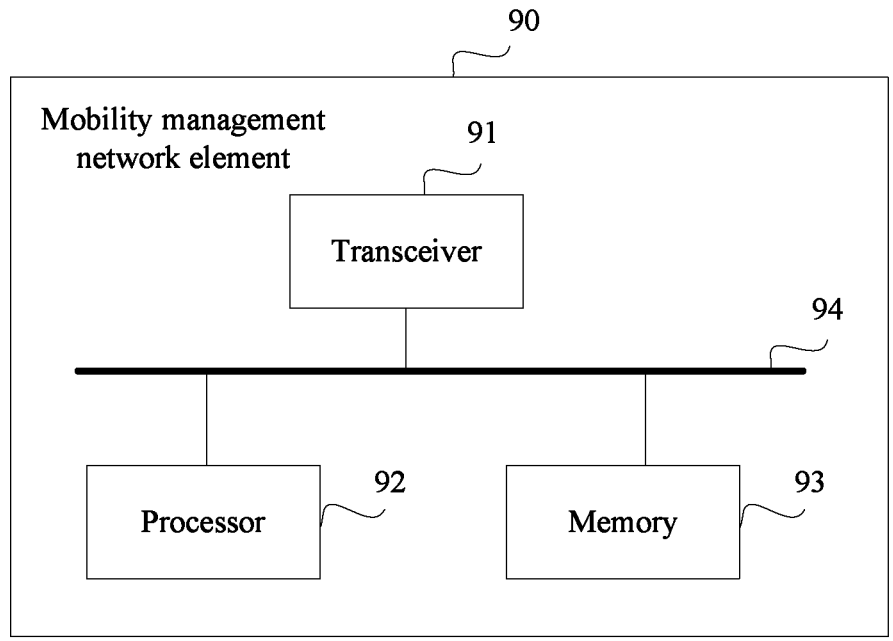
FIG. 9 is a schematic structural diagram of a mobility management network element in this application.

Based on a same inventive concept, referring to FIG. 9, this application provides a mobility management network element 90, including a transceiver 91, a processor 92, a memory 93, and a bus 94. The transceiver 91, the processor 92, and the memory 93 are all connected to the bus 94. The memory 93 stores a group of programs. The processor 92 is configured to invoke the programs stored in the memory 93, to enable the mobility management network element 90 to perform the redirection method provided in FIG. 3.

In FIG. 9, a bus architecture may include any quantity of interconnected buses and bridges, and specifically links various circuits of one or more processors represented by the processor 92 and a memory represented by the memory 93. The bus architecture may further link various other circuits such as a peripheral device, a voltage stabilizer, and a power management circuit. These circuits are all well known in the art, and therefore, are not further described in this specification. The bus provides an interface. The transceiver 91 may be multiple components, that is, the transceiver includes a transmitter and a receiver, and provides a unit configured to communicate with various other apparatuses on a transmission medium. The processor 92 is responsible for bus architecture management and general processing. The memory 93 may store data used when the processor 92 performs an operation.

Figure 10:
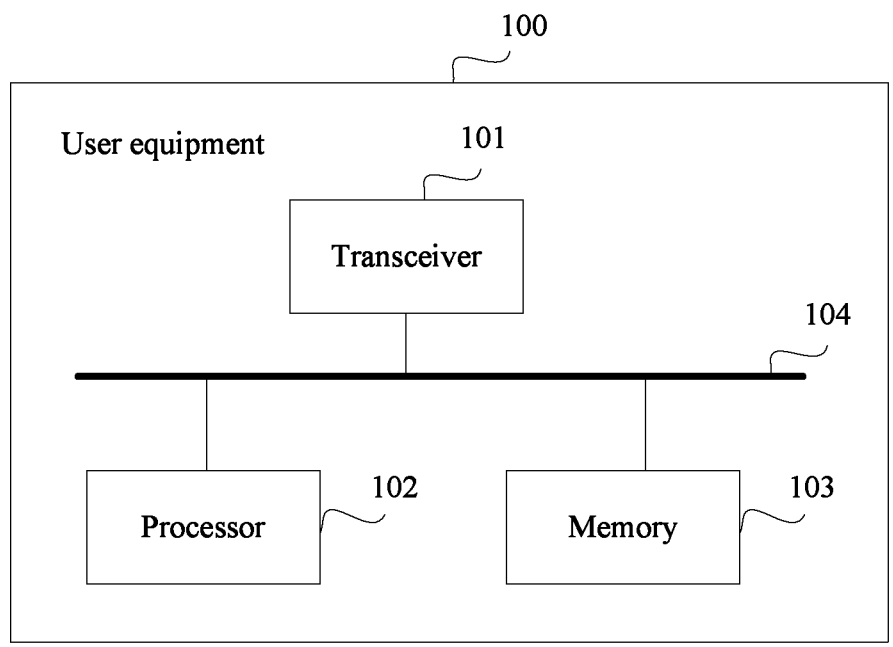
FIG. 10 is a schematic structural diagram of user equipment in this application.

Based on a same inventive concept, referring to FIG. 10, this application provides user equipment 100, including a transceiver 101, a processor 102, a memory 103, and a bus 104. The transceiver 101, the processor 102, and the memory 103 are all connected to the bus 104. The memory 103 stores a group of programs. The processor 102 is configured to invoke the programs stored in the memory 103, to enable the user equipment 100 to perform the redirection method provided in FIG. 3.

In FIG. 10, a bus architecture may include any quantity of interconnected buses and bridges, and specifically links various circuits of one or more processors represented by the processor 102 and a memory represented by the memory 103. The bus architecture may further link various other circuits such as a peripheral device, a voltage stabilizer, and a power management circuit. These circuits are all well known in the art, and therefore, are not further described in this specification. The bus provides an interface. The transceiver 101 may be multiple components, that is, the transceiver includes a transmitter and a receiver, and provides a unit configured to communicate with various other apparatuses on a transmission medium. The processor 102 is responsible for bus architecture management and general processing. The memory 103 may store data used when the processor 102 performs an operation.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some example embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Apparently, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A redirection method, comprising:
   determining, by a base station, that a redirection operation needs to be performed on user equipment (UE);
   in response to determining that the redirection operation needs to be performed in UE, instructing, by the base station, a core network to reserve a guaranteed bit rate (GBR) bearer or a voice service bearer that is corresponding to the UE; and
   instructing, by the base station, the UE to reserve the GBR bearer or the voice service bearer that is corresponding to the UE while the core network is instructed to reserve the GBR bearer or the voice service bearer, wherein the GBR bearer comprises the voice service bearer.

2. The method according to claim 1, wherein the instructing, by a base station, a core network to reserve a GBR bearer or a voice service bearer that is corresponding to the UE comprises:
   sending, by the base station, a UE context release request message to a mobility management network element, wherein the UE context release request message carries first voice redirection cause indication information, and wherein the first voice redirection cause indication information instructs reserving the GBR bearer or the voice service bearer that is corresponding to the UE.

3. The method according to claim 2, wherein the instructing, by the base station, the UE to reserve the GBR bearer or the voice service bearer that is corresponding to the UE comprises:
   sending, by the base station, a radio resource control (RRC) connection release message to the UE, wherein the RRC connection release message carries second voice redirection cause indication information, and wherein the second voice redirection cause indication information instructs reserving the GBR bearer or the voice service bearer that is corresponding to the UE.

4. The method according to claim 1, wherein the determining, by a base station, that a redirection operation needs to be performed on UE comprises:
   determining, by the base station, that the redirection operation needs to be performed on the UE when quality of a link between the base station and the UE cannot meet a current voice service quality requirement of the UE.

5. A redirection method, comprising:
   receiving, by user equipment (UE), a redirection message sent by a first base station, wherein the redirection message carries voice redirection cause indication information, and wherein the voice redirection cause indication information instructs the UE to reserve a guaranteed bit rate (GBR) bearer or a voice service bearer that is corresponding to the UE; and
   reserving, by the UE, the GBR bearer or the voice service bearer that is corresponding to the UE while a core network is instructed to reserve the GBR bearer or the voice service bearer.

6. The method according to claim 5, further comprising:
   accessing, by the UE, a second base station according to carrier information comprised in the redirection message.

7. The method according to claim 6, wherein the method further comprises:

receiving, by the UE, configuration information from the second base station and that is for setting up the GBR bearer or the voice service bearer that is corresponding to the UE; and setting up, by the UE and with the second base station according to the configuration information, the GBR bearer or the voice service bearer that is corresponding to the UE.

8. A redirection apparatus, comprising:

at least one processor, the at least one processor configured to determine that a redirection operation needs to be performed on user equipment (UE);

a transmitter, the transmitter configured to:
  send, to a core network, information instructing the core network to reserve a guaranteed bit rate (GBR) bearer or a voice service bearer that is corresponding to the UE; and
  send, to the UE, information instructing the UE to reserve the GBR bearer or the voice service bearer that is corresponding to the UE while the core network is instructed to reserve the GBR bearer or the voice service bearer, wherein the GBR bearer comprises the voice service bearer.

9. The apparatus according to claim 8, wherein the transmitter is configured to:

send a UE context release request message to a mobility management network element, wherein the UE context release request message carries first voice redirection cause indication information, and wherein the first voice redirection cause indication information instructs reserving the GBR bearer or the voice service bearer that is corresponding to the UE.

10. The apparatus according to claim 9, wherein the transmitter is configured to:

send a radio resource control (RRC) connection release message to the UE, wherein the RRC connection release message carries second voice redirection cause indication information, and wherein the second voice redirection cause indication information instructs reserving the GBR bearer or the voice service bearer that is corresponding to the UE.

11. The apparatus according to claim 8, wherein the at least one processor is configured to:

determine that the redirection operation needs to be performed on the UE when quality of a link between the apparatus and the UE cannot meet a current voice service quality requirement of the UE.

12. A redirection apparatus, comprising:

a receiver, the receiver configured to receive a redirection message from a first base station, wherein the redirection message carries voice redirection cause indication information, and wherein the voice redirection cause indication information instructs reserving a guaranteed bit rate (GBR) bearer or a voice service bearer that is corresponding to the apparatus; and at least one processor, the at least one processor configured to reserve the GBR bearer or the voice service bearer that is corresponding to the apparatus while a core network is instructed to reserve the GBR bearer or the voice service bearer.

13. The apparatus according to claim 12, wherein the at least one processor is further configured to:

access a second base station according to carrier information comprised in the redirection message.

14. The apparatus according to claim 13, wherein the at least one processor is further configured to:

set up, with the second base station according to the configuration information, the GBR bearer or the voice service bearer that is corresponding to the apparatus.

* * * * *